(12) United States Patent
Disher

(10) Patent No.: US 11,039,682 B2
(45) Date of Patent: Jun. 22, 2021

(54) PLATFORM MECHANISM

(71) Applicant: John C. Disher, Elkhart, IN (US)

(72) Inventor: John C. Disher, Elkhart, IN (US)

(73) Assignee: LIFTCO INC., Elkhart, IN (US)

( * ) Notice: Subject to any disclaimer, the term of this patent is extended or adjusted under 35 U.S.C. 154(b) by 12 days.

(21) Appl. No.: 16/699,096

(22) Filed: Nov. 28, 2019

(65) Prior Publication Data
US 2020/0170402 A1 Jun. 4, 2020

Related U.S. Application Data

(60) Provisional application No. 62/772,762, filed on Nov. 29, 2018.

(51) Int. Cl.
*A47B 5/04* (2006.01)
*A47B 13/08* (2006.01)

(52) U.S. Cl.
CPC .............. *A47B 5/04* (2013.01); *A47B 13/081* (2013.01); *A47B 2200/0036* (2013.01)

(58) Field of Classification Search
CPC ......... A47B 5/04; A47B 5/006; A47B 13/081; A47B 2200/0036; B64D 11/0638; B64D 11/0605; A47C 7/70
USPC ...... 108/134, 135, 20, 42, 40, 115; 321/306, 321/312
See application file for complete search history.

(56) References Cited

U.S. PATENT DOCUMENTS

| | | | | |
|---|---|---|---|---|
| 1,790,468 A | * | 1/1931 | Frank et al. | A47C 7/70 108/38 |
| 1,809,866 A | * | 6/1931 | Riesche | A47B 5/04 108/38 |
| 2,330,627 A | * | 9/1943 | Reynolds | A47C 7/624 297/145 |
| 6,520,091 B1 | * | 2/2003 | Dettmers | A47B 5/006 108/42 |
| 6,684,540 B1 | * | 2/2004 | Tufts | D06F 81/06 38/137 |
| 8,205,562 B2 | * | 6/2012 | St. Louis | B64D 11/00 108/38 |
| 8,205,563 B2 | * | 6/2012 | St. Louis | B64D 11/00 108/40 |
| 8,205,564 B2 | * | 6/2012 | St. Louis | B64D 11/06 108/147 |

(Continued)

FOREIGN PATENT DOCUMENTS

| | | | |
|---|---|---|---|
| AT | 516253 | * | 4/2016 |
| AT | 516954 | * | 10/2016 |

(Continued)

*Primary Examiner* — Janet M Wilkens
(74) *Attorney, Agent, or Firm* — Botkin & Hall, LLP

(57) ABSTRACT

A stowable platform is connected to a frame with a first and second trolley, each trolley is moveable inside a channel and has an upper and lower roller. The lower rollers are tied to a mechanism that moves them in the channels in a linear motion. The upper rollers are in contact with one side of the channel from the offset center of gravity in the platform. The platform moves between a stored position defined by the lower roller near a terminal end of the channel and a use position defined by the upper roller located in an overhanging end of the channel and the lower roller closer to the overhanging end than the terminal end.

19 Claims, 13 Drawing Sheets

(56) References Cited

U.S. PATENT DOCUMENTS

| | | | | |
|---|---|---|---|---|
| 8,695,513 | B2* | 4/2014 | Figueras Mitjans ... | A47B 5/006 |
| | | | | 108/115 |
| 9,481,464 | B2* | 11/2016 | Gow .................. | B64D 11/0605 |
| 9,955,779 | B2* | 5/2018 | Hoeftberger ............. | A47B 5/04 |
| 9,988,149 | B2* | 6/2018 | Maillaut ............ | B64D 11/0638 |
| 10,383,434 | B2* | 8/2019 | Enzinger ............ | B64D 11/0638 |
| 10,617,207 | B2* | 4/2020 | Hsiao ........................ | A47B 5/04 |
| 2005/0258672 | A1* | 11/2005 | Schweizer ............. | B60N 3/001 |
| | | | | 297/145 |
| 2007/0227407 | A1* | 10/2007 | Cartensen .............. | A47B 5/006 |
| | | | | 108/33 |
| 2009/0078169 | A1* | 3/2009 | Osborne ............ | B64D 11/0638 |
| | | | | 108/40 |
| 2012/0325124 | A1* | 12/2012 | St. Louis ............... | B64D 11/00 |
| | | | | 108/44 |
| 2017/0313229 | A1* | 11/2017 | Isernio ..................... | B60N 2/79 |
| 2018/0110323 | A1* | 4/2018 | Enzinger .................. | A47B 5/04 |

FOREIGN PATENT DOCUMENTS

| | | | |
|---|---|---|---|
| DE | 3015556 | * | 10/1981 |
| EP | 1836927 | * | 9/2007 |
| FR | 2802070 | * | 6/2001 |

* cited by examiner

PLATFORM MECHANISM

CROSS REFERENCE TO RELATED APPLICATIONS

This application claims the benefit of U.S. Provisional Application No. 62/772,762, filed Nov. 29, 2018, the disclosures of which are hereby incorporated by reference.

BACKGROUND OF THE INVENTION

This present disclosure relates to hidden and stowable platforms. For living spaces with limited storage and space, such as RVs, travel trailers, and "micro homes," it is desirable to have a flexible space that can accommodate a sleeping area, work surface, countertop, or table that can then be stowed away and out of sight when unneeded. Many other devices attempt to solve this problem but involve additional components, complicated assembly, or multiple steps to move the platform between the use position and stored position. Others are prone to jamming or are difficult to use. An improved stowable platform is needed.

SUMMARY OF THE INVENTION

The present disclosure describes a stowable platform that moves between a stored and a use position in a single motion. The platform includes a frame with L-shaped channels. Rollers reside in the channel and allow the platform to slide outwardly from a stored position and then pivot as the platform reaches the use position. The center of gravity for the platform is offset from the channels. The offset center of gravity puts the uppermost rollers in biased contact with one side of the channels. When the platform is raised and the uppermost rollers reach the L-shaped portion, the uppermost roller follows the inside curve and the platform pivots about the lowermost roller to a horizontal position. A motor may be implemented to rotate screws that are attached to one of the rollers to move the platform between the stored and use positions.

DESCRIPTION OF THE PREFERRED EMBODIMENT

Figure 1:
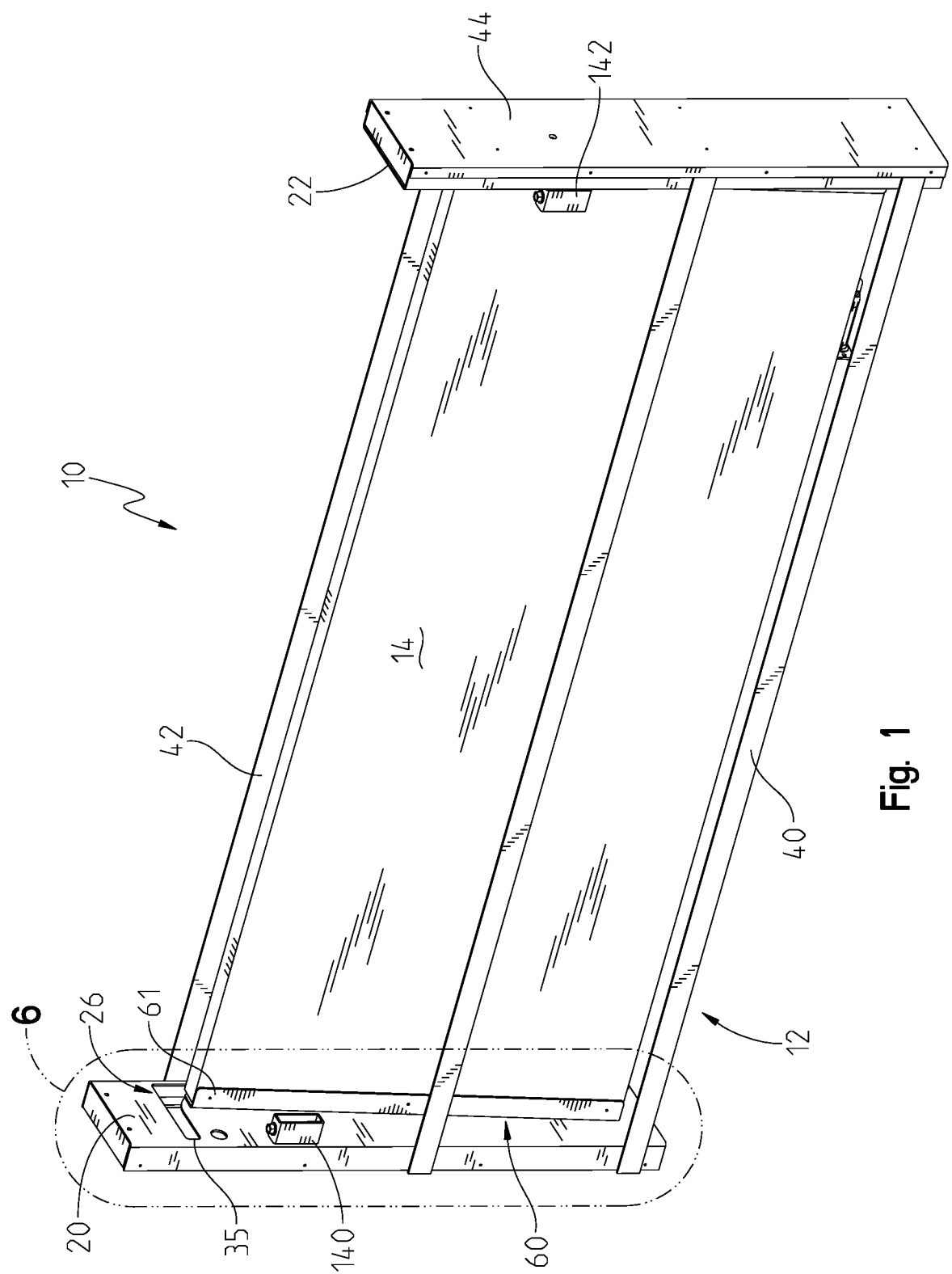
FIG. 1 is an isometric side view of the device in the stored position.
Figure 3:
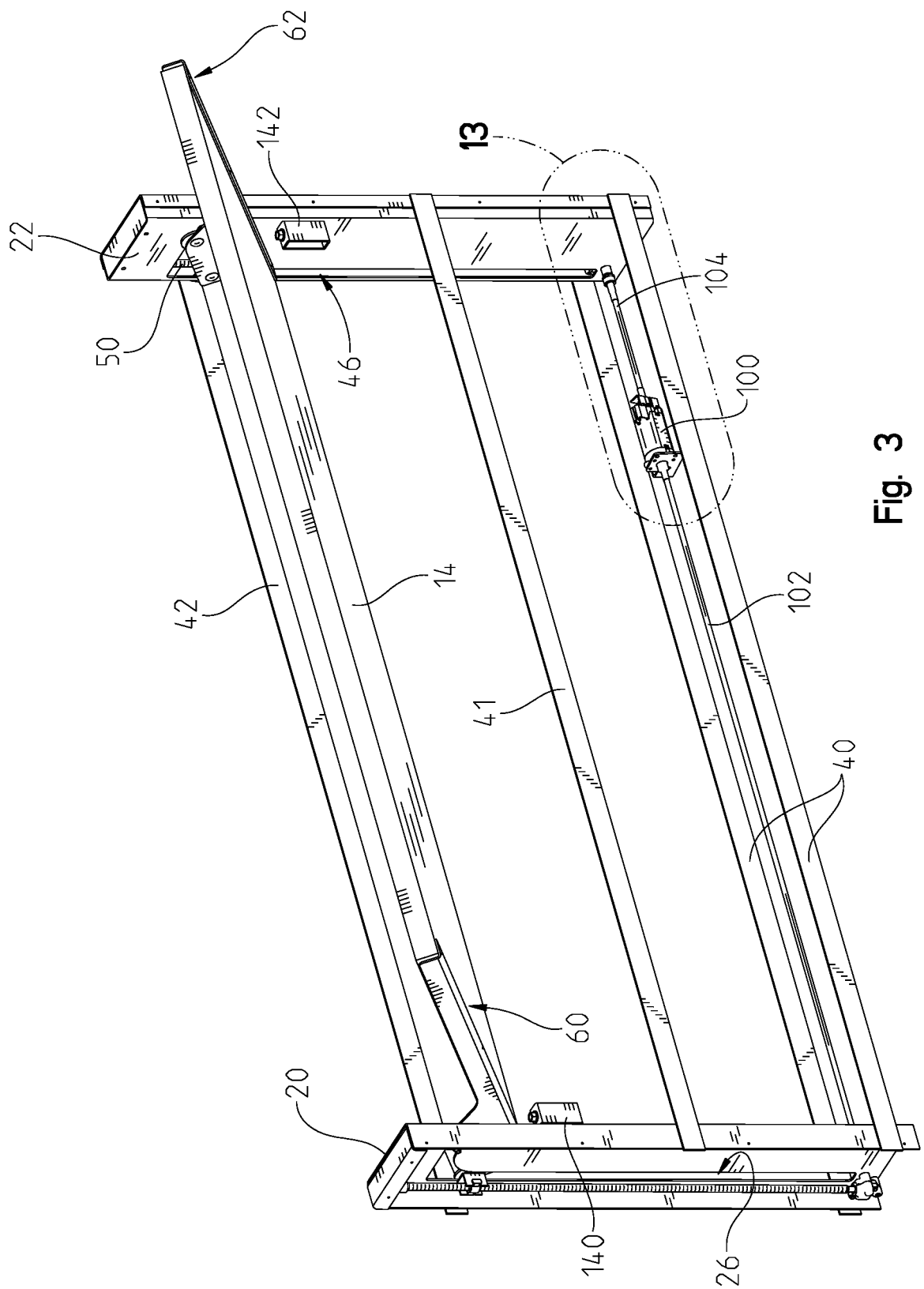
FIG. 3 is an isometric view of the device moving between the stored position and the use position.
Figure 4:
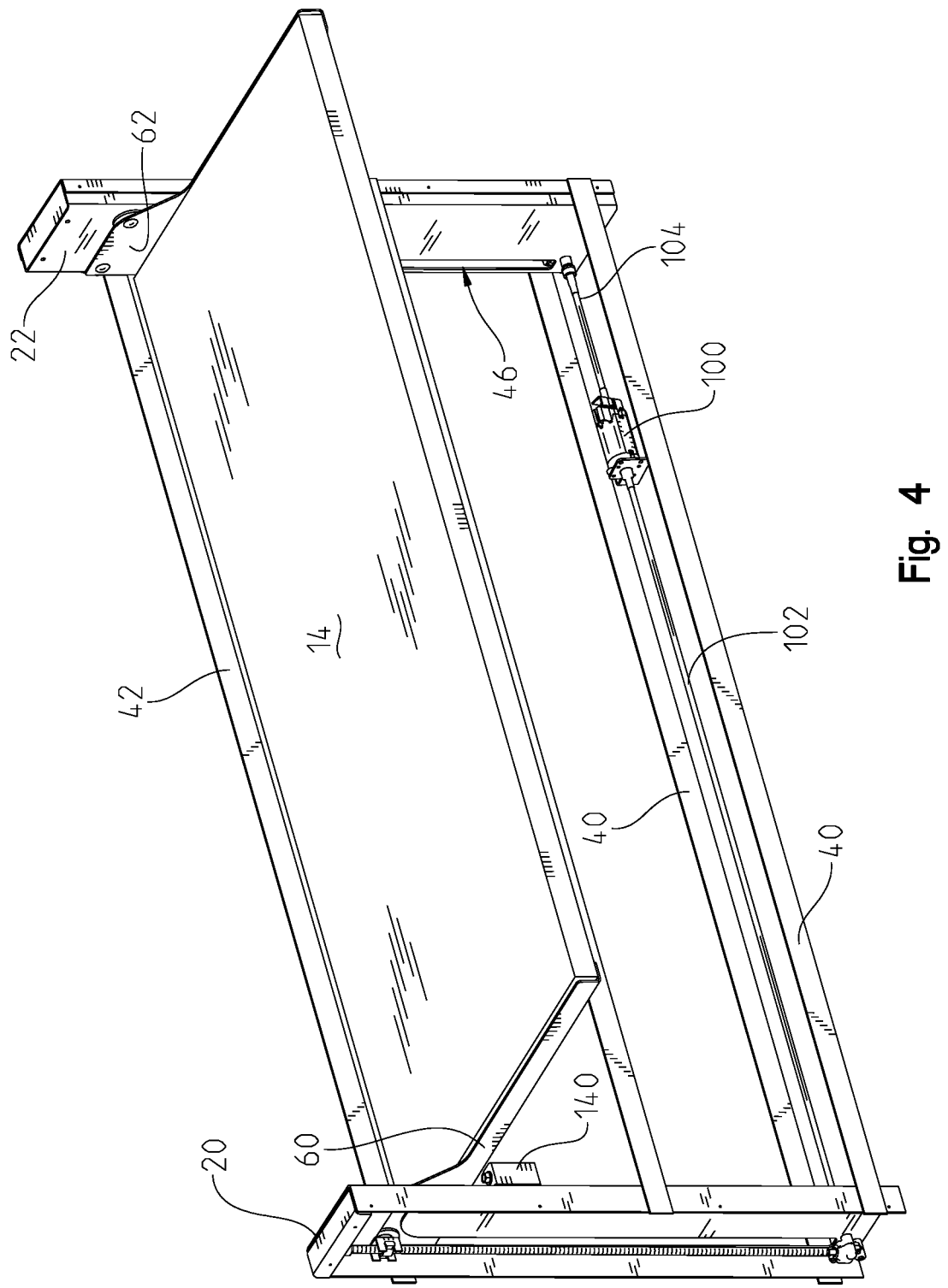
FIG. 4 is an isometric view of the device in the use position.
Figure 9:
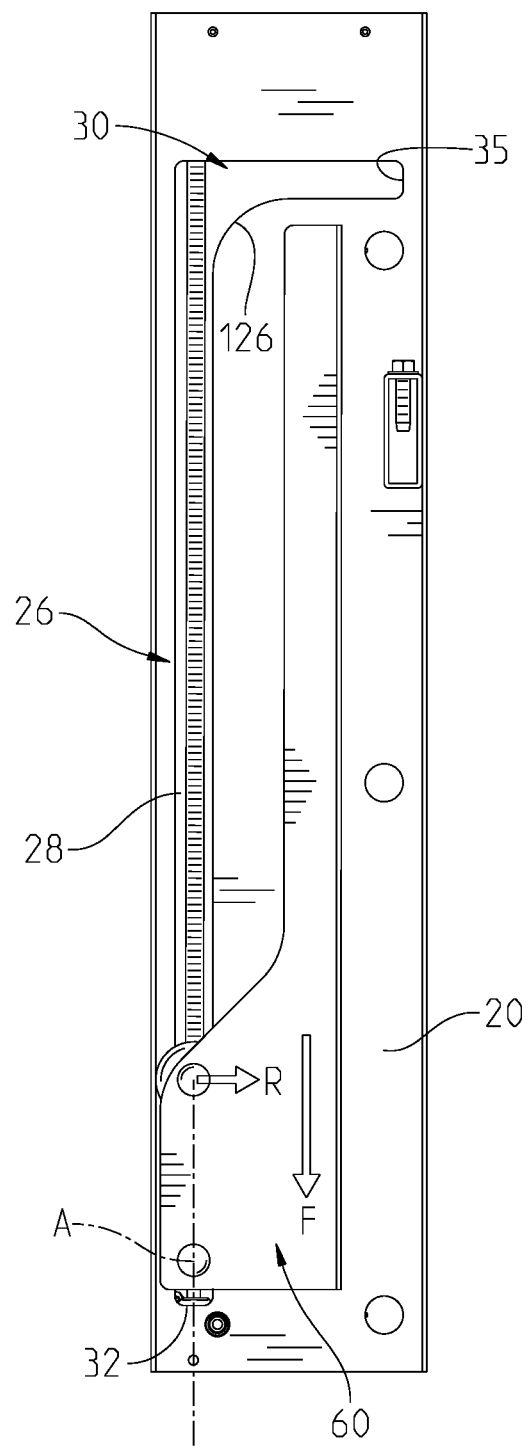
FIG. 9 is a side view of the first end showing force vectors.
Figure 10:
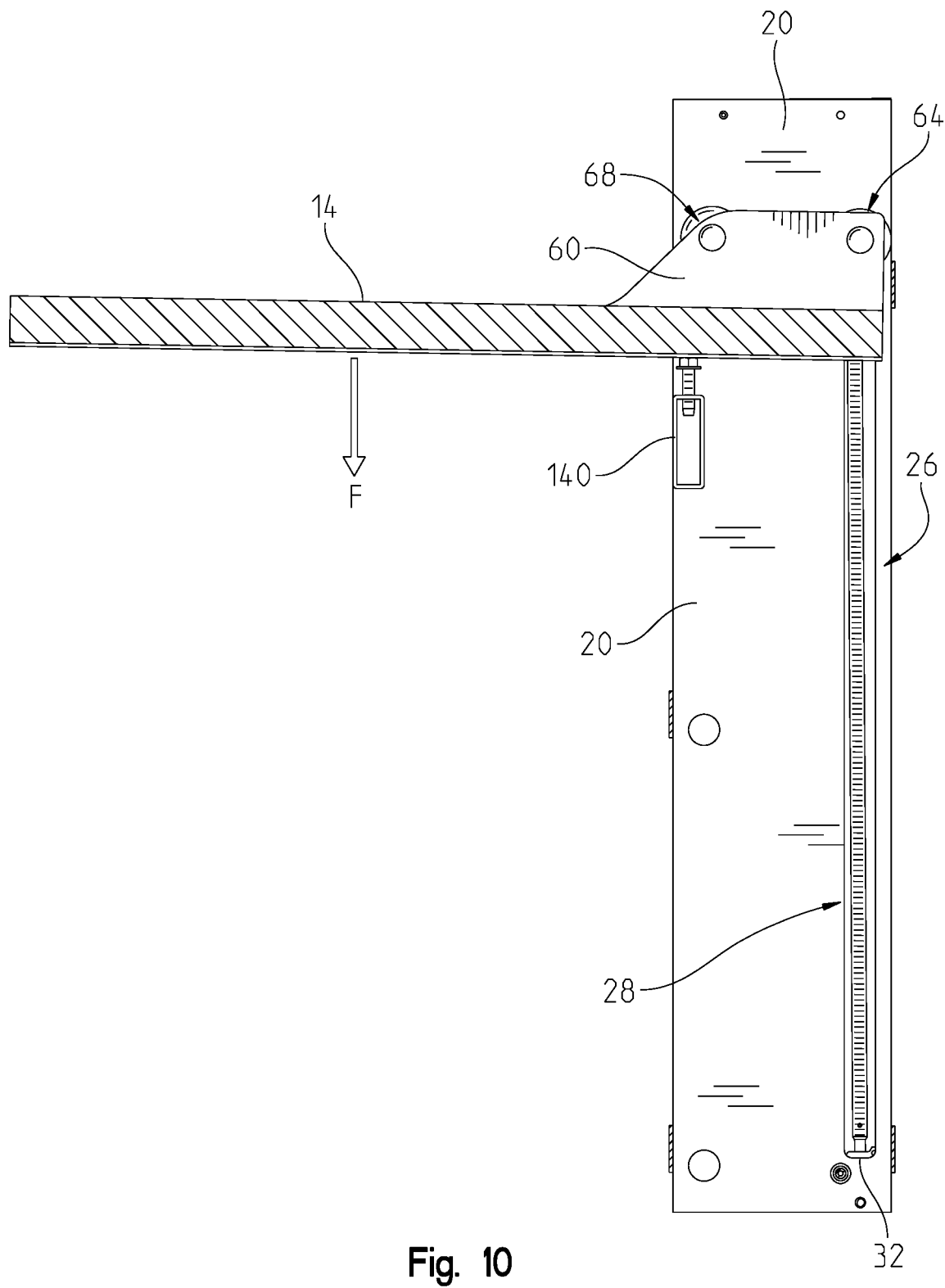
FIG. 10 is a side view of the first end in the use position.
Figure 11:
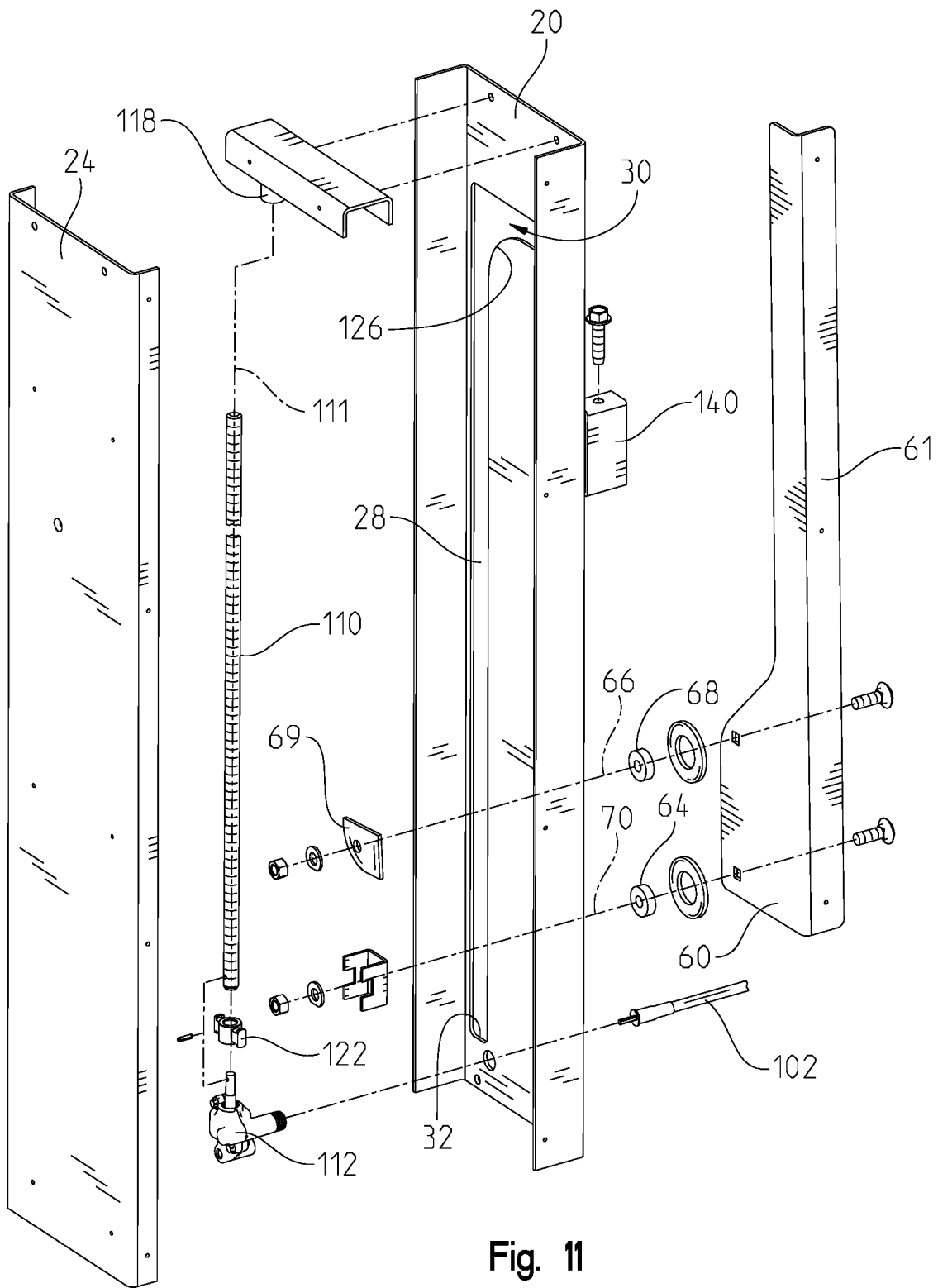
FIG. 11 is an exploded view of the first end.

A platform system 10 is shown in FIGS. 1-14 and is designed to be attached to a living space or piece of furniture (not shown). The platform system 10 has a frame 12 and a platform 14. The frame 12 has mounting holes or points to secure it to another object, such as a floor, wall, or other piece of furniture. The platform 14 is movable between a stored position and a use position. In the stored position, the platform 14 is located inside the frame 12 as shown in FIG. 1. When in the use position, the platform 14 is cantilevered out as shown in FIGS. 4 and 10.

The frame 12 has a first end 20 and an oppositely located second end 22. The first end 20 is an elongate structural member, shown as stamped metal with an L-shaped channel 26. The end 20 includes a cover 24 that offers protection, adds strength, and prevents other items from becoming entangled with moving components. To show the internal components better, the cover 24 is not shown in FIGS. 1-5 and 7-9. The channel 26 has an elongate portion 28 that is straight, with a consistent width, and has a terminal end 32 at the bottom. The elongate portion 28 extends between the terminal end 32 and a pivoting portion 30. The pivoting portion 30 terminates at an overhanging end 35 that is perpendicular to the elongate portion. The overhanging end 35 faces outward. Where the pivoting portion 30 meets the elongate portion 28, the channel 26 is wider. The second end 22 is a mirror image of the first end 20 and is affixed to the first end 20 through frame members 40, 41, 42. The frame members are shown as affixed to the ends 20, 22, but it is contemplated that the frame members 40, 41, 42 are adjustable to accommodate different sizes of platforms 14. The second end 22 is mirror symmetrical to the first end 20 with an identical channel 46 with a consistent width elongate portion 48 that is straight and a terminal end 52. The second end 22 includes a corresponding cover 44. The elongate portion 48 extends between the terminal end 52 and pivoting portion 50. The pivoting portion 50 extends out perpendicularly and terminates at an end 54. As shown in the FIGS., the pivoting portions 30, 50 have wider areas where it meets the elongate portion 28. The terminal end 35 is straight across from the wider area.

A first trolley 60 is constrained by the channel 26 and a corresponding second trolley 62 is constrained by the second channel 46. The channels 26, 46 are aligned. The first trolley 60 has a lower roller 64 that rotates about a lower roller axis 66 and an upper roller 68 that rotates about an upper roller axis 70. The lower roller axis 66 is parallel to the upper roller axis 70. The first trolley 60 includes a mounting flange 61 to affix the trolley 60 to the platform 14. Likewise, the second trolley 62 is constrained by the second channel 46. It has a lower roller 74 that rotates about the lower roller axis 66 and an upper roller 78 that rotates about the upper roller axis 70. It is contemplated that the lower roller 74 and upper roller 78 have their own axis that is not aligned with the axis 66, 70. The rollers 64, 68, 74, 78 are sized to slide smoothly inside their corresponding channel 26, 46. To prevent the upper rollers 68, 78 from leaving their respective channels 26, 46, a flange washer 69, 79 is implemented adjacent the upper rollers 68, 78.

The frame 12 may be powered or manual, depending on the needs of the user. For the powered frame shown in the FIGS, a motor 100 connects to a first cable 102 and second cable 104 that synchronously rotate with the motor 100. The cable 102 connects to a rotary screw 110 through a gearbox 112. The screw 110 is attached to the first end 20 and can rotate about its central axis 111. Correspondingly, cable 104 connects to a rotary screw 114 through a gearbox 116. The screw 114 is attached to the second end 22 and can rotate about its central axis. The gearboxes 112, 116 are attached to the ends 20, 22 and support the screws 110, 114. The screws 110, 114 are each supported at the top by a bearing 118, 120 attached to the corresponding end 20, 22. The gearboxes 112, 116 may include 45 degree bevel gears or a worm drive. As can be seen in FIGS. 9 and 10, the screws 110, 114 are in line with the channels 26, 46. It is contemplated that another coupling mechanism is used to convert rotation of the cable to rotation of the screw. As the cables 102, 104 rotate, the corresponding screws 110, 114 will rotate. The lower roller 64 is coupled to the screw 110 with a threaded block 122 such that rotation of the screw 110 causes the threaded block 122 to move along the axis of the screw 110 and therefore causes the lower roller 64 to move in the channel 26. Likewise, the lower roller 74 is coupled to the screw 114 with a threaded block 132 such that rotation of the screw 114 causes the threaded block 132 to move along the axis of the screw 114 and therefore causes the lower roller 74 to move in the channel 46.

Figure 2:
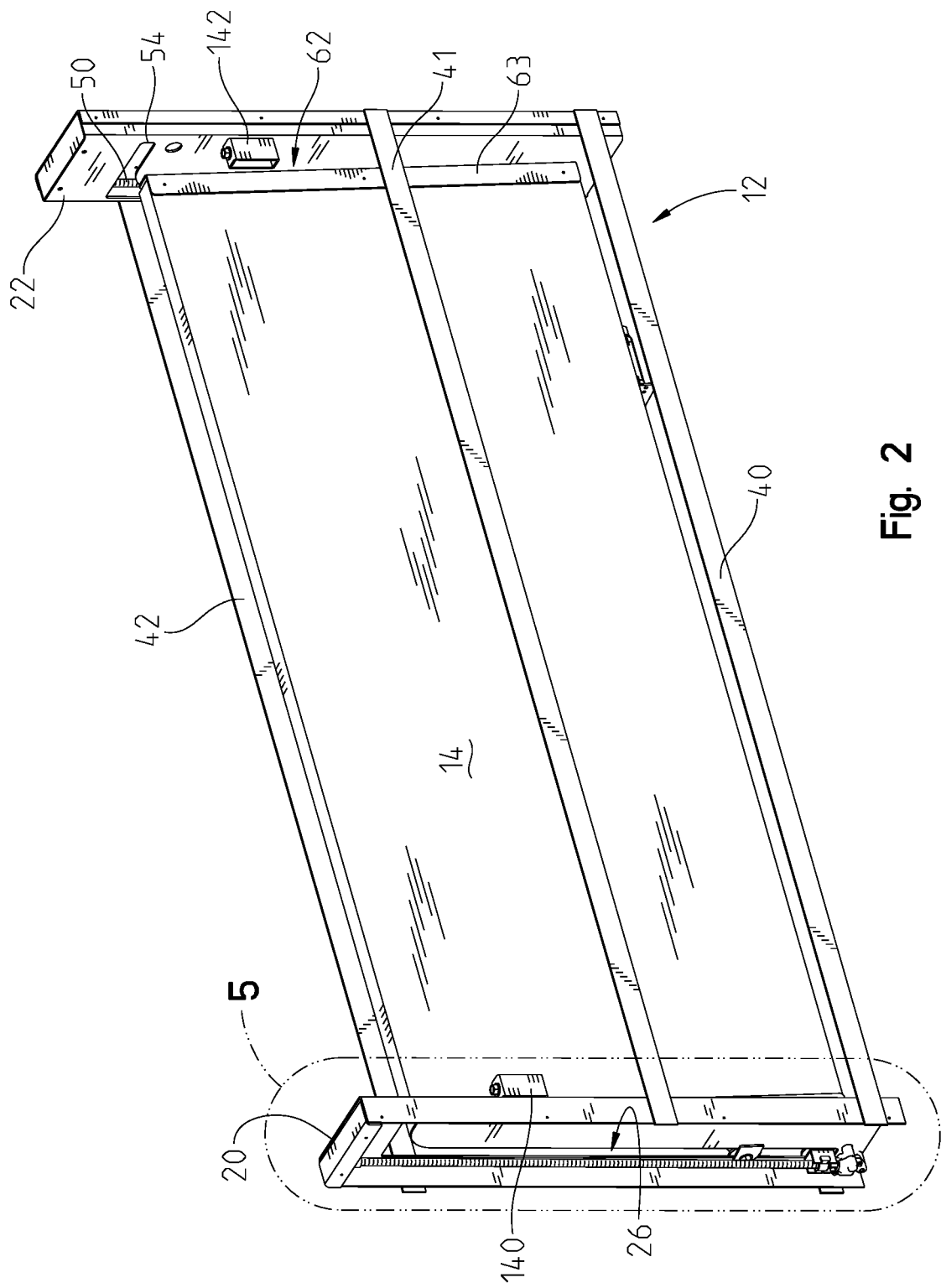
FIG. 2 is an alternate isometric side view of the device of FIG. 1 in the stored position.
Figure 5:
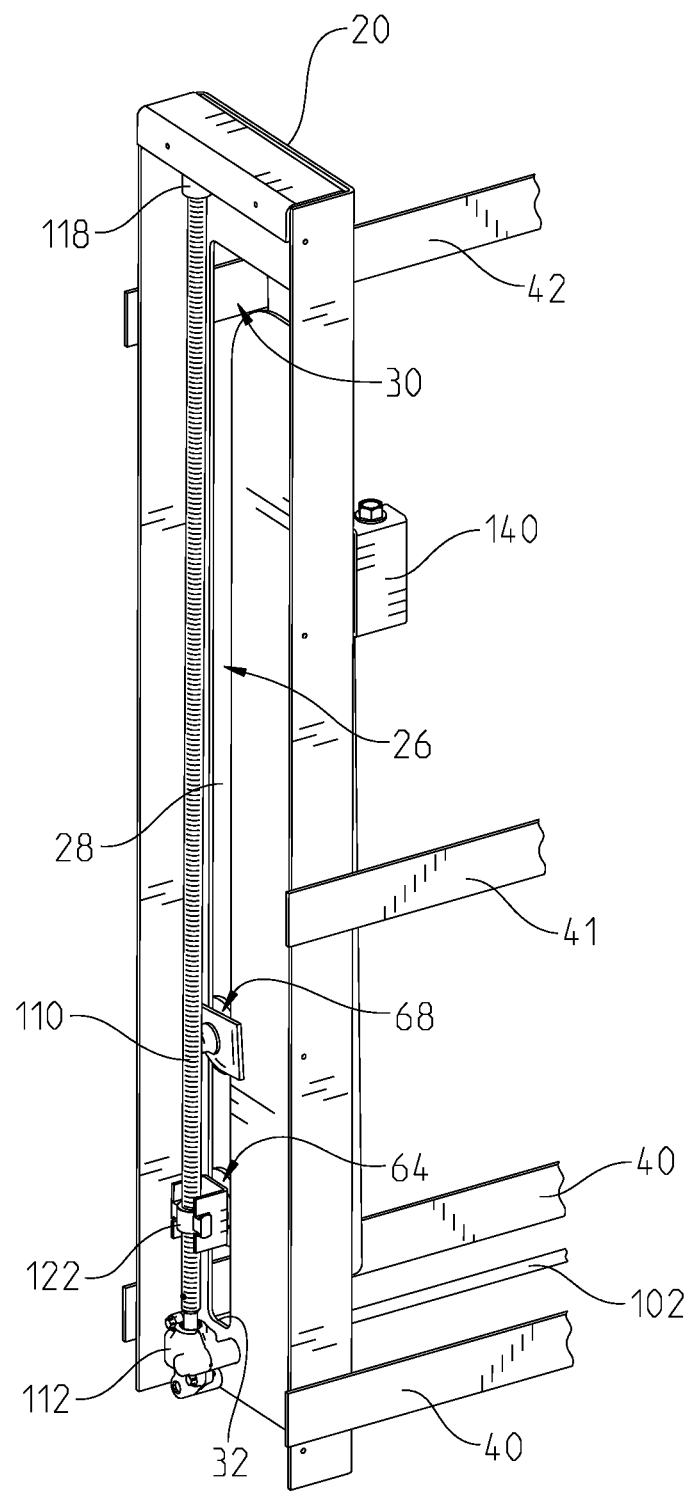
FIG. 5 is a partial isometric view 5 of the device in FIG. 2 with the cover removed.
Figure 6:
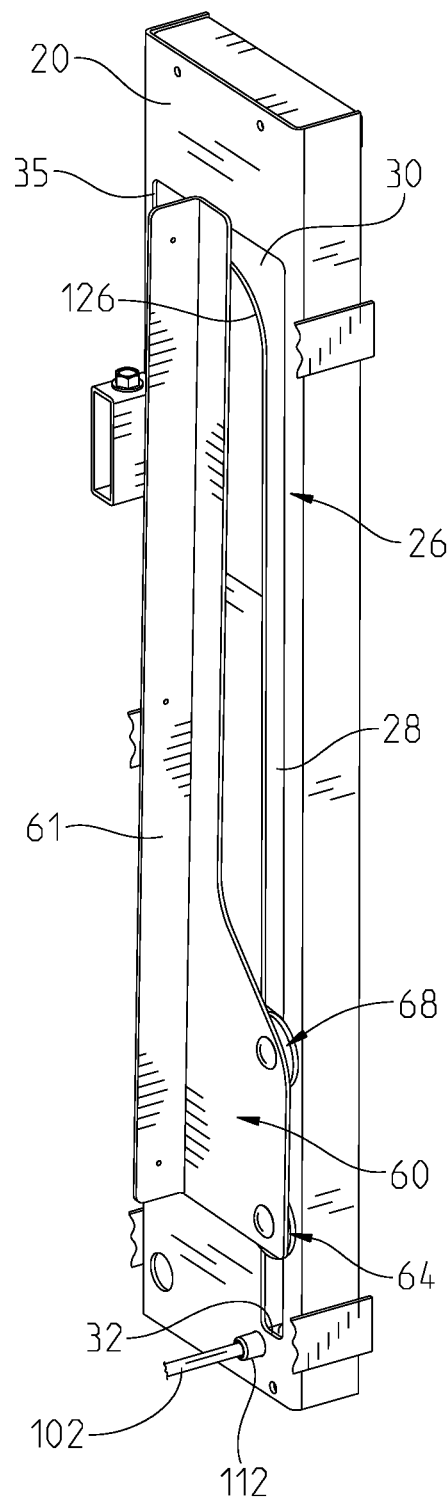
FIG. 6 is a partial isometric view 6 of the device in FIG. 1 with the platform removed.
Figures 7, 8:
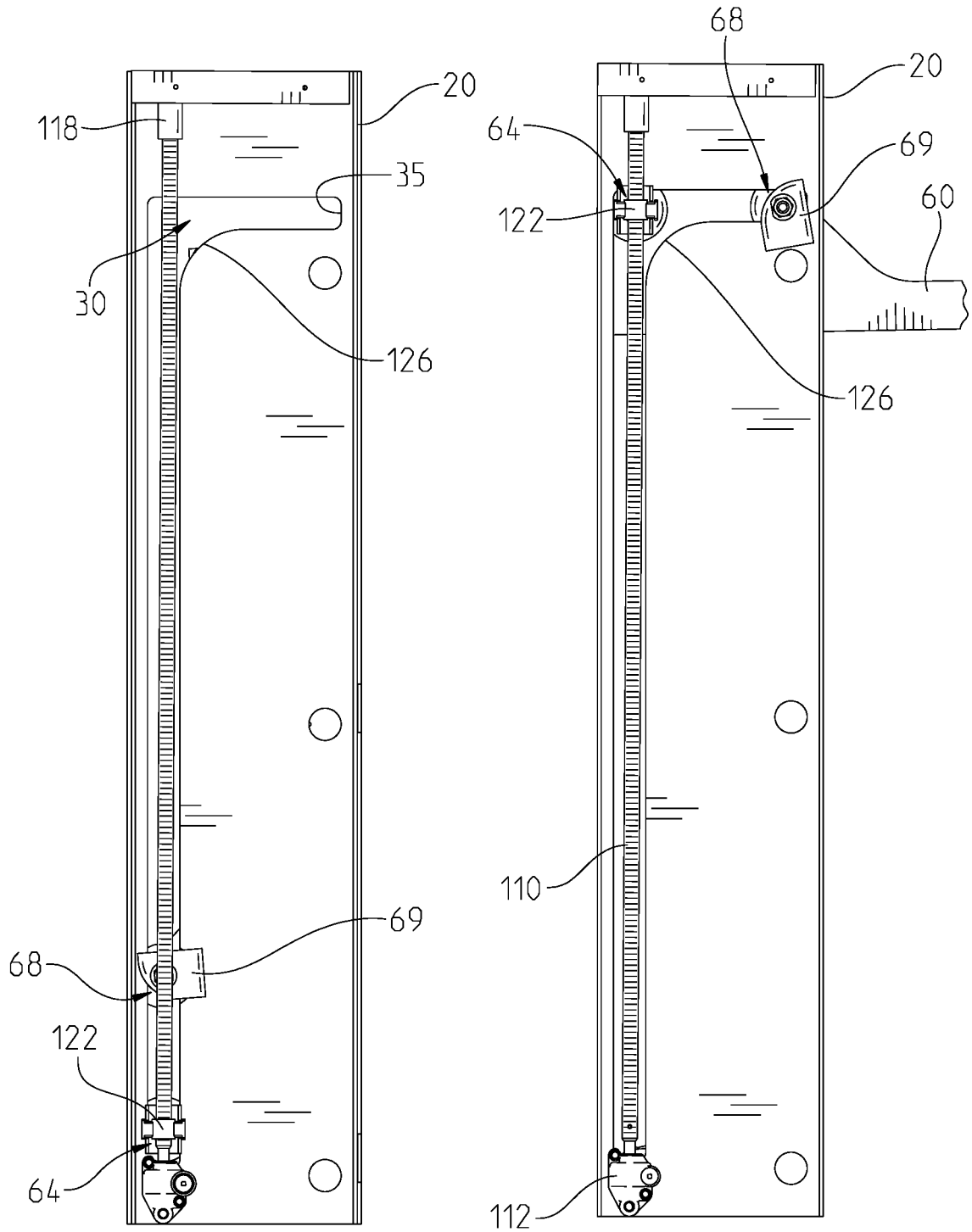
FIG. 7 is a side view of the end assembly in FIG. 5 with the mechanism in the stored position.
FIG. 8 is a side view of the assembly in FIG. 7 with the mechanism in the use position.
Figure 12:
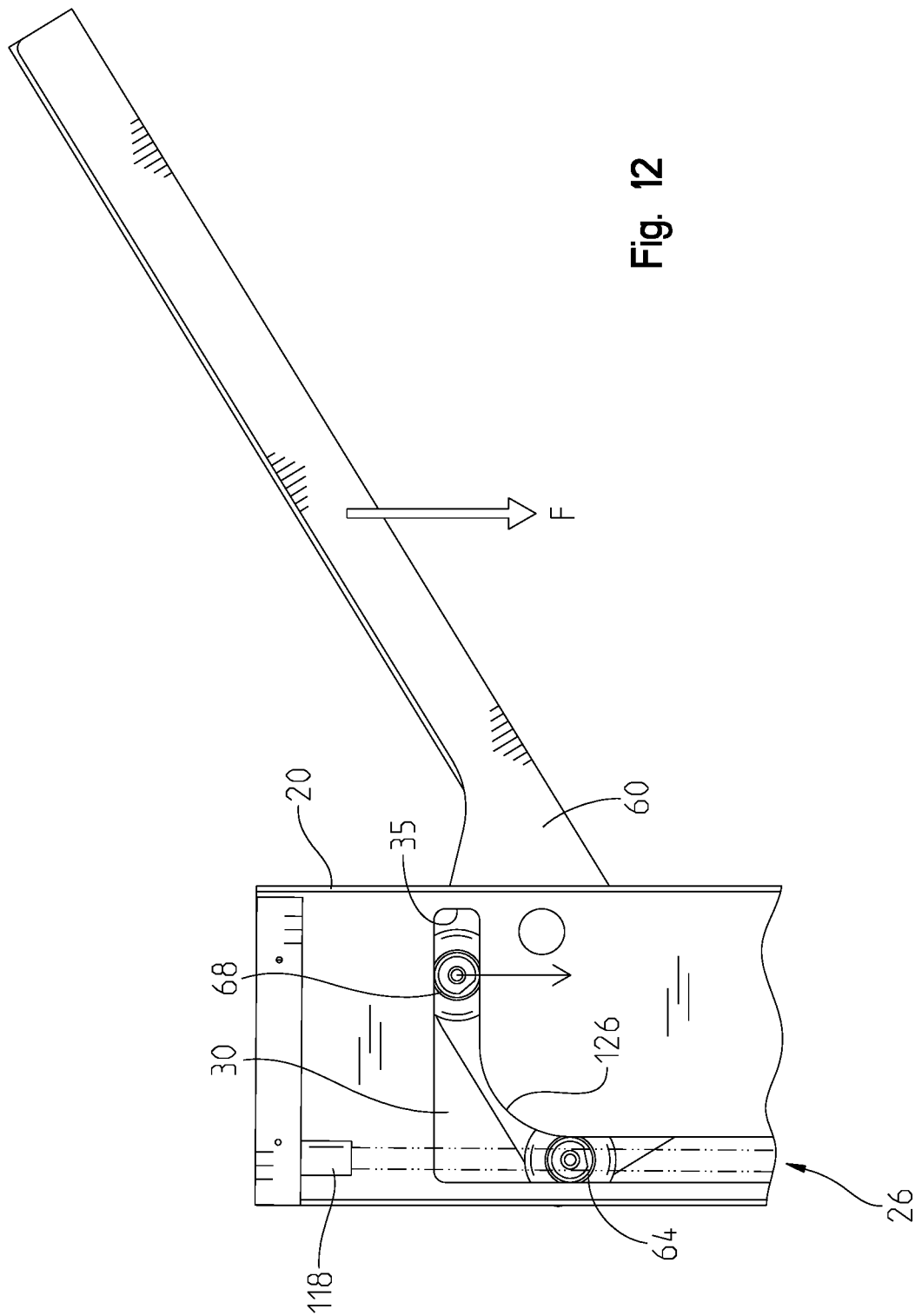
FIG. 12 is a partial view 12 of the device moving between the stored and use position.
Figure 13:
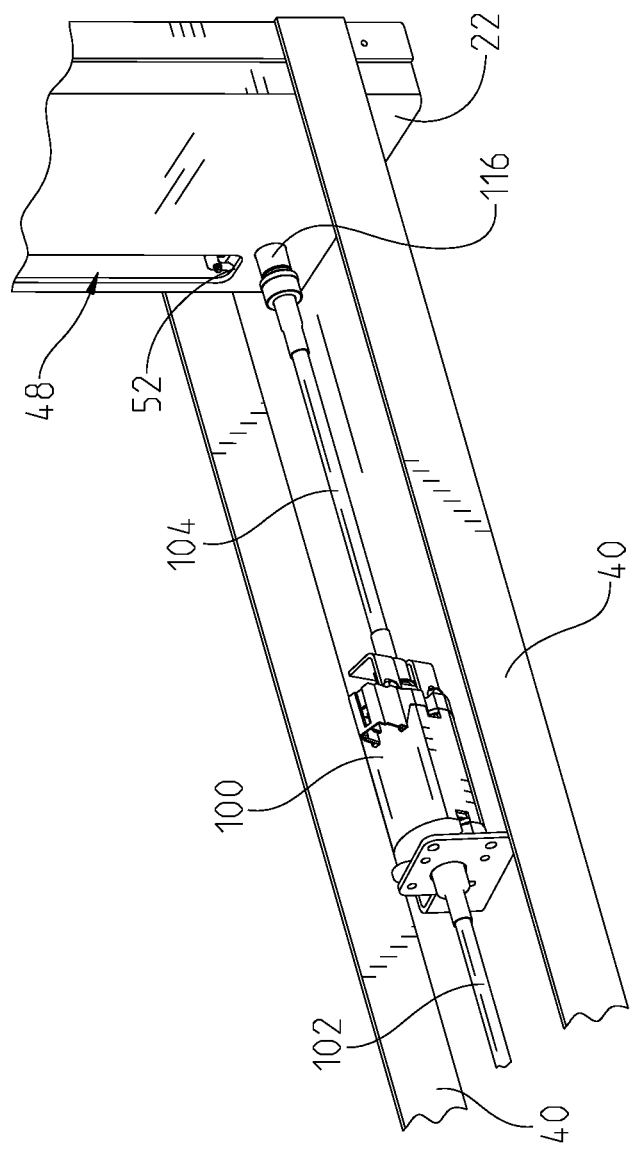
FIG. 13 is a partial isometric view of the lower portion of the frame and motor.
Figure 14:
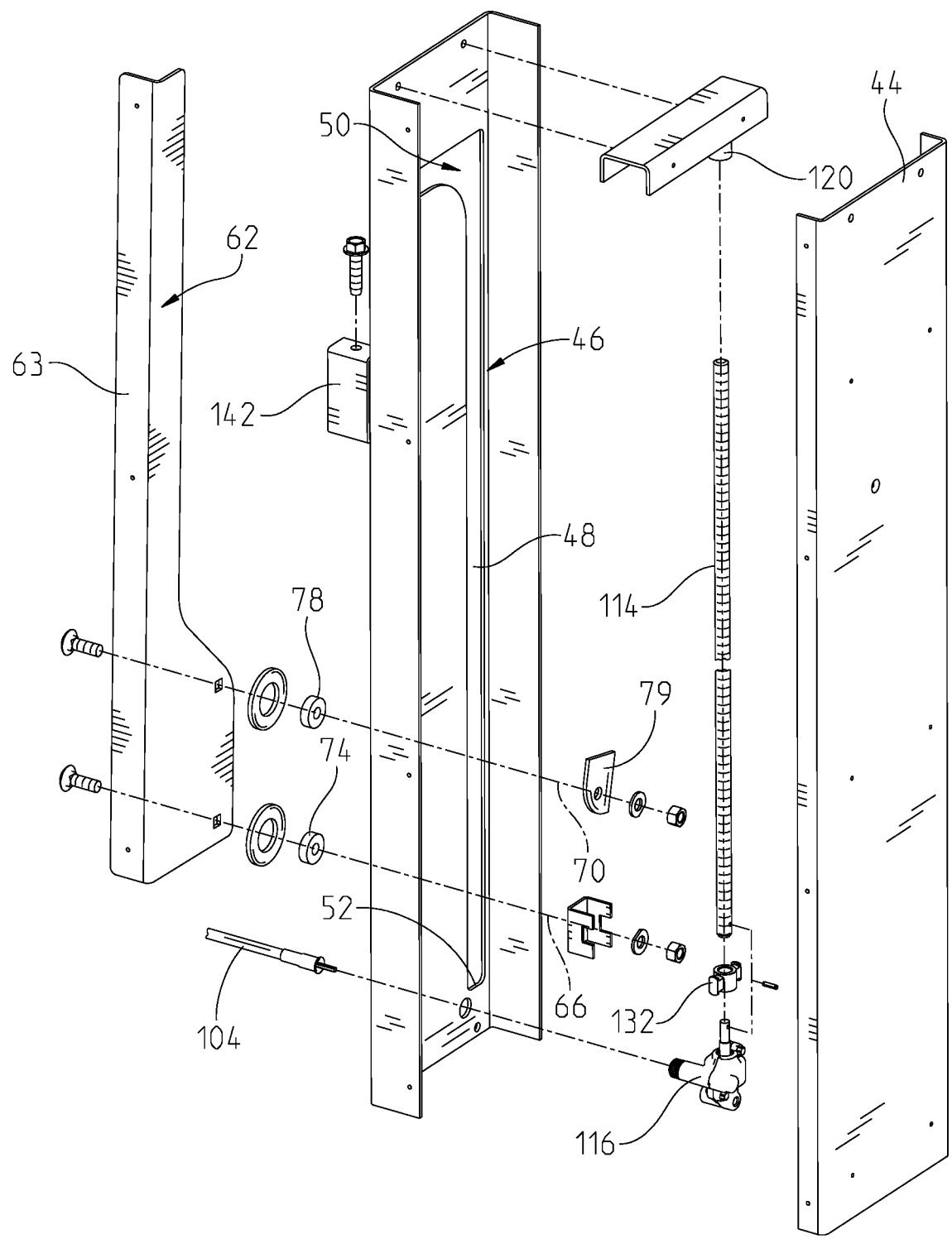
FIG. 14 is an exploded view of the second end.

For simplicity, the operation of the first end 20 will be described herein. The second end 22 operates the same as the first end 20. In the stored position, the weight of the platform 14 is offset from the channels 26. This is represented by a force F, shown in FIG. 9. This offset is also shown in FIG. 5. The lower roller 64 is supported by and tied to the threaded block 122. Because the lower roller 64 is tied to the threaded block 122, it can only move in a linear direction. This forms a pivot point A, about which the trolley 60 wants to rotate. Because the force F is offset and the lower roller is constrained, this causes a force R, where the upper roller 68 is in biased contact on an inner edge of the channel 26. No matter where the platform is between the stored and use position, the force F is always offset from the elongate portions 28, 48. Moving from the stored position as shown in FIGS. 1, 2, and 7, the lower roller 64 on the trolley 60 moves away from the terminal end 32, as shown in FIG. 5. As soon as the upper roller 68 meets the pivoting portion 30, the first trolley 60 begins to pivot as shown in FIGS. 3 and 12. The lower roller 64 moves in a straight line that is parallel to the axis of the screw 110, while the upper roller 68 follows the inside edge 126 of the channel 26. The inside edge 126 extends from the terminal end 32 to the overhanging end 35 with a large radius in the pivoting portion 30. When the lower roller 64 nears the end of the screw 110, the trolley 60 has pivoted to the use position, shown in FIG. 8. This puts the lower roller 64 much closer to the overhanging end 35 than the terminal end 32. In the use position, the trolley 60 is commonly perpendicular from the stored position, but other angles are contemplated.

Each end 20, 22 includes an adjustable stop 140, 142 that extends outwardly from the corresponding end 20, 22. The adjustable stop 140, 142, shown in FIGS. 5 and 9, contacts the mounting flange 61, 63 of the trolley 60, 62. The adjustable stops 140, 142 each have a threaded fastener that is positionable to adjust the use position, shown in FIG. 10.

For a manual frame, a counterbalance may be implemented to offset the weight of the trolleys 60, 62 and platform 14. The counterbalance attaches between the trolley or roller and frame to apply a biasing force that offsets the weight of the platform.

While not shown in the figures, limit switches may be implemented to control the motor and prevent overtravel of the trolleys 60, 62 or collision of the lower rollers 64, 74 to the terminal ends 32, 52 or to the ends of the elongate portions 28, 48 where they meet the pivoting portions 30, 50. Further, a current-limiting controller may be used to sense the threaded blocks 122, 132 contacting stops on the screws or the rollers contacting the terminal ends of the channels 26, 46.

The terms "lower" and "upper" are merely for identification and clarity; they do not strictly define position and are not to be construed as a limiting characteristic. For example, the system 10 could be ceiling mounted or horizontally mounted. It is understood that while certain aspects of the disclosed subject matter have been shown and described, the disclosed subject matter is not limited thereto and encompasses various other embodiments and aspects. No specific limitation with respect to the specific embodiments disclosed herein is intended or should be inferred. Modifications may be made to the disclosed subject matter as set forth in the following claims.

What is claimed is:

1. A retractable platform comprising:
   a first end having an L-shaped first channel, said first channel having an elongate portion extending to a pivoting portion;
   a first trolley having a first lower roller rotatable about a lower axis and a first upper roller rotatable about an upper axis, said lower axis spaced at a fixed distance from and parallel to said upper axis, said first lower and upper rollers retained in and movable along said first channel, said first lower roller coupled to a first screw;
   a second end spaced from and parallel to said first end, said second end having an L-shaped second channel aligned with said first channel, said second channel having an elongate portion extending to a pivoting portion;
   a second trolley having a second lower roller rotatable about said lower axis and a second upper roller rotatable about said upper axis, said lower and upper rollers of said second trolley retained in and movable along said second channel, a second screw coupled to said second lower roller;
   a platform located between and affixed to said first trolley and said second trolley, said platform having a center of gravity offset from said elongate portion of said channels;
   a motor coupled to said first screw and said second screw, when said motor rotates, said first and second screws move said trolleys along said channels; and
   said first and second trolleys are movable between a stored position and a use position, said stored position corresponding to said first and second lower rollers adjacent terminal ends of corresponding said elongate portions, said use position defined by said upper rollers located in a corresponding overhang portion.

2. The retractable platform in claim 1, wherein said first and second lower rollers move only in a straight line.

3. The retractable platform in claim 1, wherein said first channel is wider at said pivoting portion, said first upper roller follows an inside edge of said first channel, said second channel is wider at said pivoting portion, said second upper roller follows an inside edge of said second channel.

4. The retractable platform in claim 1, wherein said first and second trollies pivot about said first and second lower rollers.

5. The retractable platform in claim 1, further comprising a flange washer affixed to said first upper roller between said first end and a first cover.

6. The retractable platform in claim 1, further comprising adjustable screws located on said first and second ends, said adjustable screws contacting said first and second trollies when said platform is in said use position.

7. A retractable platform comprising:
a frame having a first end and a second end, said first end fixed with respect to said second end, said first end having a first channel with an elongate portion extending to a pivoting portion, said first end having a first trolley with a first upper roller and a first lower roller, each said first roller retained in said first channel, said first end having a first screw coupled to said first lower roller such than rotation of said first screw causes said first lower roller to move along said first channel;
said second end having a second channel with an elongate portion and pivoting portion, said second channel aligned with said first channel, said second end having a second trolley with a second upper roller and a second lower roller, each said second roller retained in said second channel, said second end having a second screw coupled to said second lower roller such that rotation of said second screw causes said second lower roller to move along said second channel;
a platform affixed to said first and second trollies, said platform movable between a stored position and a use position, said stored position defined by said platform located completely between said first and second ends, said use position defined by said platform cantilevered and protruding from one side of said frame;
a motor coupled to said first and second screws, when said motor rotates, said screws rotate to move said lower rollers along said channels;
said platform having a center of gravity offset from said elongate portions of said first and second channels, said first and second upper rollers in biased contact with corresponding inside edges of said first and second channel.

8. The retractable platform in claim 7, wherein said first and second lower rollers move only in a straight line, said first and second upper rollers extend into said pivoting portions of said first and second channels in said use position.

9. The retractable platform in claim 7, wherein said center of gravity is offset from said elongate portions of said first and second channels at all points between said stored and said use position.

10. The retractable platform in claim 7, wherein said first and said second channels each having an overhanging end located in each said pivoting portion, said first and second upper rollers adjacent said overhanging end when said platform is in said use position.

11. The retractable platform in claim 7, wherein said first channel is wider at said pivoting portion, said first upper roller follows an inside edge of said first channel, said second channel is wider at said pivoting portion, said second upper roller follows an inside edge of said second channel.

12. The retractable platform in claim 7, further comprising adjustable screws located on said first and second ends, said adjustable screws contacting said first and second trollies when said platform is in said use position.

13. A retractable platform comprising:
a frame having a first end and a second end, said first end fixed with respect to said second end, said first end having a first channel with an elongate portion extending to a pivoting portion, said first end having a first trolley with a first upper roller and a first lower roller, each said first roller retained in said first channel;
said second end having a second channel with an elongate portion and pivoting portion, said second channel aligned with said first channel, said second end having a second trolley with a second upper roller and a second lower roller, each said second roller retained in said second channel;
a platform affixed to said first and second trollies, said platform movable between a stored position and a use position, said stored position defined by said platform located completely between said first and second ends, said use position defined by said platform protruding from one side of said frame and said first and second upper rollers located adjacent a corresponding overhanging end of said first and second channels;
said platform having a center of gravity that places said first and second upper rollers in biased contact with corresponding inside edges of said first and second channel.

14. The retractable platform in claim 13, wherein said first end having a first screw coupled to said first lower roller such than rotation of said first screw causes said first lower roller to move along said first channel, said second end having a second screw coupled to said second lower roller such that rotation of said second screw causes said second lower roller to move along said second channel.

15. The retractable platform in claim 13, further comprising a motor coupled to said first and second screws, when said motor rotates, said screws rotate to move said lower rollers along said channels.

16. The retractable platform in claim 13, wherein said center of gravity of said platform is offset from said elongate portions of said first and second channels.

17. The retractable platform in claim 13, wherein said first and second lower rollers move only in a straight line, said first and second upper rollers extend into said pivoting portions of said first and second channels in said use position.

18. The retractable platform in claim 13, wherein said center of gravity is offset from said elongate portions of said first and second channels at all points between said stored and said use position.

19. The retractable platform in claim 13, wherein said first channel is wider at said pivoting portion, said first upper roller follows an inside edge of said first channel, said second channel is wider at said pivoting portion, said second upper roller follows an inside edge of said second channel.

* * * * *